N. W. STORER.
SYSTEM OF CONTROL.
APPLICATION FILED JULY 5, 1917.
1,327,789.
Patented Jan. 13, 1920.
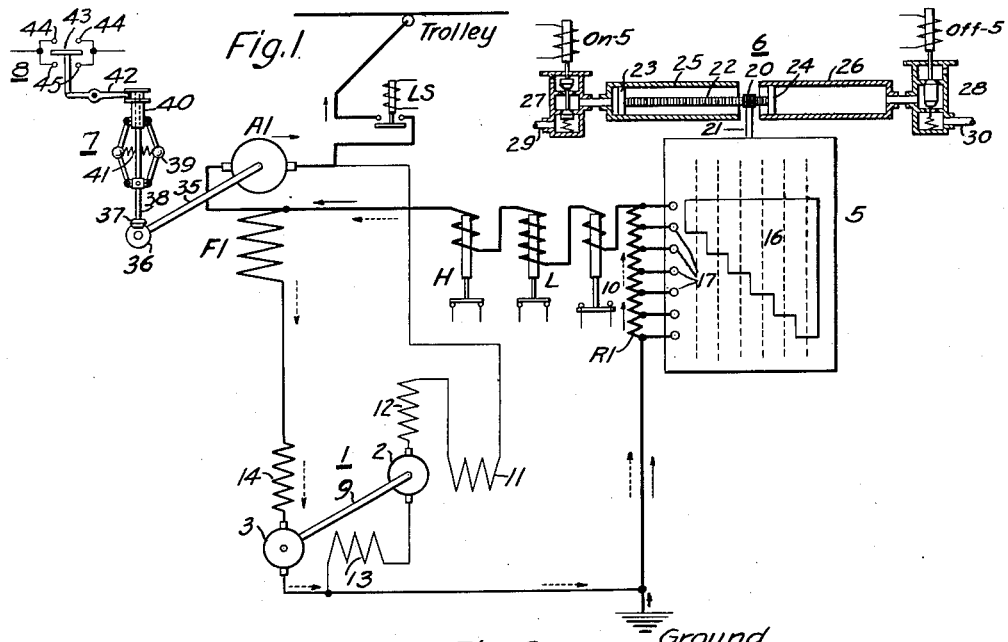
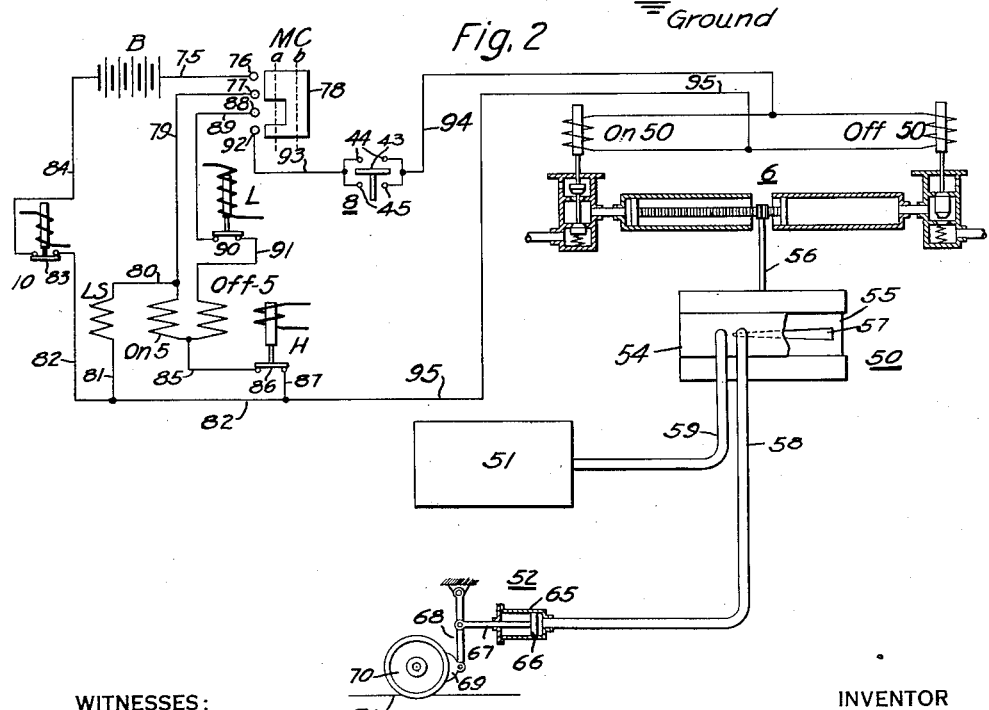
WITNESSES:
Fred. C. Kilharm
W. R. Coley
INVENTOR
Norman W. Storer
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,327,789.   Specification of Letters Patent.   Patented Jan. 13, 1920.

Application filed July 5, 1917. Serial No. 178,546.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control and especially to the automatic combination of electrical and mechanical braking systems for electric railway vehicles and the like.

The object of my invention is to provide, in a system of the above-indicated character, simple and effective means for normally braking a momentum-driven machine electrically, together with an automatic arrangement for rendering a mechanical braking system operative under predetermined high-speed conditions and releasing the application of the mechanical braking system upon a predetermined decrease of speed.

Other minor objects of my invention will become apparent from the following detailed description and are pointed out with particularity in the various claims.

My invention may best be understood by reference to the accompanying drawing, wherein Figure 1 is a digrammatic view of the essential main and exciting circuits of a system of control embodying my present invention, together with a centrifugally-operated device for performing certain functions to be set forth, and Fig. 2 is a diagrammatic view of an auxiliary governing system for the main circuits of Fig. 1 and also for a mechanical braking system of a familiar type.

Referring to Fig. 1, the system shown comprises suitable supply-circuit conductors, "Trolley" and "Ground"; a main dynamo-electric machine having an armature A1 and a field winding F1 of the series type; a motor-generator set 1 having a driving armature 2 and an exciting armature 3; a variable resistor R1 that is associated with the main armature and field winding in a manner to be set forth and which is governed by a suitable controller 5, having an operating mechanism 6; a centrifugally-operated device 7 for governing a switch or set of contact members 8; a line switch LS and a plurality of limit switches or relays H, L and 10.

The armature windings 2 and 3 of the motor-generator set 1 may be mechanically connected in any suitable manner, as by a shaft 9. The driving armature 2 is connected across the supply circuit through an exciting field winding 11 and a compensating field winding 12 and also through an exciting field winding 13 for the generating armature 3, which is likewise provided with a compensating field winding 14. However, it will be understood that the particular form of motor-generator or other auxiliary source of energy that is employed is immaterial to the present invention.

The controller 4 comprises a movable contact segment 16 of suitable configuration for successively engaging a plurality of stationary control fingers 17 that are connected to various points of the resistor R1, to gradually exclude the resistor from circuit, as the controller is successively actuated through its operative positions.

The operating mechanism 6 for the controller 5 is of a familiar electrically-controlled, pneumatically-actuated type and comprises a pinion 20 which is rigidly secured to operating shaft 21 of the controller and is adapted to mesh with a horizontally-movable rack member 22, the opposite ends of which constitute pistons 23 and 24 that travel within suitable operating cylinders 25 and 26, respectively. A normally closed valve 27 is associated with the outer end of the cylinders 25 to admit fluid pressure thereto whenever an actuating coil On—5 of the valve is energized, while a normally open valve 28 communicates with the outer end of the other cylinder 26 and is provided with an actuating coil Off—5. Fluid pressure from any suitable source (not shown) is admitted to the valves 27 and 28 through pipes or passages 29 and 30, respectively.

The operation of the mechanism just described, without regard to the electrical connections effected thereby, may be described as follows: By reason of the normal admission of fluid pressure to the cylinder 26, the apparatus is biased to the illustrated position, wherein the entire resistor R1 is included in circuit. Upon concurrent energization of the actuating coils On—5 and Off—5, the initial unbalanced fluid-pressure conditions are reversed, that is, fluid pressure is admitted to the cylinder 25 through the opened valve 27 and is released from the cylinder 26 through the closed valve 28. A forward movement of the controller 5 thus occurs until the actuating coil Off—5 is deënergized, whereupon fluid-pressure conditions in the mechanism 6 are balanced, and a positive and reliable stoppage of the device is secured.

To effect a return movement of the controller, the actuating coils are both deënergized, whereby fluid-pressure conditions revert to the original unbalanced state, and the desired backward actuation is produced.

The centrifugal device 7 may be of any well-known type and is shown as comprising the familiar fly-ball governor. The axle 35 of the main armature A1, or a shaft rotatable therewith, may be provided with a bevel gear 36 with which a coöperating horizontally-located bevel gear 37 meshes, to rotate a shaft 38 upon which are suitably mounted balls or weights 39 for determining the position of a slidable collar 40, in conjunction with a plurality of suitable springs 41, as is customary. A centrally pivoted lever 42 has one end positioned to be actuated by the slidable collar 40, while the other end of the lever is provided with a vertically movable contact member or disk 43 of the switch 8 that is adapted to bridge a pair of stationary contact members 44 in the extreme upper portion, corresponding to relatively high-speed conditions of the main motor, and to bridge a pair of stationary contact members 45 under relatively low-speed conditions of the main motor, corresponding to the end of the electrical braking period.

The high-current limit switch or relay H is designed to be lifted from its illustrated normal position to open certain auxiliary circuits that are shown and described in connection with Fig. 2, whenever the regenerated current attains a relatively high value. On the other hand, the low-current limit switch or relay L is adapted to be raised from its illustrated circuit-closing position whenever the current exceeds a predetermined lower value.

The relay device 10 is arranged to drop to its lower circuit-opening position when the regenerative current reaches a very low value, as at the end of the regenerative period, when effective electrical braking is no longer feasible by reason of the slow speed of the vehicle.

Reference may now be had to Fig. 2, wherein the system shown comprises the actuating coils for the switch LS and for the operating mechanism 6, and the coöperating contact members of the several limit switches L, H and 10 and of the centrifugally-governed switch 8, together with a master controller MC having a plurality of operative positions $a$ and $b$, a battery B for energizing various circuits in accordance with the master-controller position; and an engineer's valve 50 that is suitably associated with a fluid-pressure tank or reservoir 51 for governing the operation of a mechanical braking system, such as the well-known air-brake, as indicated at 52.

The engineer's valve 50 may be of any suitable form, and is shown as comprising a stationary frame member 54; and a movable drum or cylinder 55 that is provided with an operating shaft 56 and that has a tapered slot 57 for effecting variable communication between an outlet pipe 58 to the air-brake 52 and a supply pipe 59 from the reservoir 51 whenever the engineer's valve occupies an operative position.

The movable member 55 of the valve is actuated by means of the previously-described operating mechanism 6 and the actuating coils thereof are respectively designated as On—50 and Off—50 to distinguish from the actuating coils for the operating mechanism that is illustrated in Fig. 1. Otherwise, no further description of the construction or operation of the valve 50, and the actuating apparatus thereof is deemed necessary.

The mechanical braking system 52 is illustrated, in a simple manner, as comprising a brake cylinder 65 with which the outlet pipe 58 communicates; a suitable piston 66 that travels within the cylinder 65 and the stem or rod 67 of which is pivotally associated with a brake-shoe rod 68. The upper end of the rod 68 is pivotally mounted upon a stationary portion of the vehicle frame and the lower end of the rod is pivotally secured to a brake-shoe 69 that is adapted to bear upon a wheel 70 running along a track rail 71.

Inasmuch as the particular preliminary system for effecting regenerative operation, in accordance with the illustrated circuit connections of Fig. 1, is immaterial to my present invention, I have not deemed it necessary to illustrate or describe such circuit connections. Assuming, therefore, that the system is normally operating under regenerative conditions, which require the previous actuation of the master controller MC to its final operative position $b$, the auxiliary circuits effected thereby may be described as follows:

One circuit is established from the positive terminal of the battery B through conductor 75, control fingers 76 and 77, which are bridged by contact segment 78 of the master controller, conductors 79 and 80, the actuating coil of the line switch LS, conductors 81 and 82, coöperating stationary and movable contact members 83 of the relay device 10 in its upper position, and conductor 84 to the negative terminal of the battery B.

A further circuit is completed from the contact segment 78 of the master controller through control finger 88, conductor 89, coöperating stationary and movable contact members 90 of the low-current limit switch L in its lower position, conductor 91, the actuating coil Off—5, conductor 85, coöperating stationary and movable contact members 86 of the high-current limit switch H in its lower position, and conductor 87 to the negative conductor 82, whence circuit is completed as already traced.

The actuating coil On—5 is also initially energized by reason of the connection thereof between conductors 79 and 85.

Consequently, the controller 5 is forwardly actuated in a step-by-step manner, dependent upon the intermittent energization of the actuating coil Off—5 by the low-current limit switch L, unless a relatively high regenerative current obtains, whereupon the high-current limit switch H is lifted to open the energizing circuits of both actuating coils and thereby cause a backward movement of the controller. In this way, the regenerated current is automatically maintained within predetermined limiting values corresponding to the setting of the limit switches H and L.

The illustrated main-circuit connections, which are intended to be merely representative of any suitable electrical braking system, are not of my present invention, but are fully set forth and claimed in a copending application of R. E. Hellmund and R. E. Ferris, Serial No. 25,714, filed May 4, 1915, patented April 1, 1919, No. 1,298,943, and assigned to the Westinghouse Electric & Manufacturing Company. Consequently, only a brief description thereof will be necessary. The main or regenerative circuit is established from the trolley through the switch LS, the main armature A1, the actuating coils of the limit switches H, L and 10, the variable resistor R1, and thence to the negative supply-circuit conductor Ground.

The main-field-winding circuit is established from the positive or grounded terminal of the exciting armature 3 through the resistor R1 in the same direction as the regenerated current, the actuating coils of the limit switches 10, L and H, the main field winding F1, and the compensating field winding 14 for the exciting armature 3 to the negative terminal thereof. The regenerated and exciting currents are indicated by solid and dotted arrows, respectively. Briefly stated, the forward actuation of the controller 5 in the above-described manner serves to gradually short-circuit the resistor R1 and thus increase the main-field-winding excitation to offset the gradual decrease of vehicle speed during the regenerative period.

If, for any reason, such as the descent of a grade, the vehicle speed should approach a dangerously high value, the resultant action of the centrifugal device 7 will cause the movable contact member 44 of the switch 8 to bridge the upper stationary contact members 43, whereby a circuit is completed from the contact segment 78 of the master controller, through control finger 92, conductor 93, coöperating stationary and movable contact members 44 and 43, respectively, of the switch 8, conductor 94, the parallel-related actuating coils On—50 and Off—50 of the operating mechanism 6 for the engineer's valve 50, and conductor 95 to the negative battery conductor 82.

The concurrent energization of the coils On—50 and Off—50 effects forward movement of the engineer's valve 50 to apply the air-brake 52 to the vehicle wheel or wheels 70, and an application, gradually increasing in force, will continue as long as the switch 8 occupies the described upper position. In this way, the vehicle speed will be reduced a certain amount, dependent upon the operating characteristics of the centrifugal device 7. As a typical example, it may be stated that the vehicle speed will decrease at least 5 miles per hour before the mechanical brakes are released, and, consequently, the vehicle speed will vary between limiting values, not less than 5 miles per hour apart, for a certain length of time during which the regulation of the main-field-winding-excitation by the controller 5 does not become necessary.

Thus, if a locomotive is descending a grade, with a heavier train than it is capable of retarding through the sole agency of electrical braking, the air-brake or other mechanical braking system is automatically rendered operative under predetermined high-speed conditions and is released under certain lower-speed conditions, whereby the train is automatically prevented from reaching an excessive speed.

As previously set forth, the regenerated current is maintained between the limiting values that are determined by the limit switches H and L, and electrical braking is continued until a relatively low vehicle speed, where regenerative operation is no longer practical, is reached. Under such low-current conditions, the relay device 10 drops to its lower or circuit-opening position, and, consequently, the line switch LS is opened to disconnect the main machine from the supply circuit and also the actuating coils for the controller 5 are deënergized to cause it to return to its illustrated initial position.

Furthermore, the attainment of such a low vehicle speed may be utilized to cause the centrifugal device 7 to assume such a position that the movable contact member 43 of the switch 8 bridges the lower stationary contact members 45 to again automatically effect the application of the air-brake 52, as previously described.

It will be seen that I have thus provided a braking system for electric railway vehicles, wherein the entire retarding operation of the vehicle on a down grade, for example, is entirely automatic from the time that regeneration is begun at the top of the grade until the train speed has been reduced to such a value, by reason of running along a more level stretch of track, that the airbrakes may be automatically applied to bring the train to a standstill.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of vehicle control, the combination with a dynamo-electric machine and an electrically-controlled mechanical braking system, of means for electrically braking said machine, and means independent of electrical conditions of the machine and responsive to the mechanical operation thereof for energizing the electrical control of said braking system at times and deënergizing said control upon a restoration of the original mechanical conditions of the machine.

2. In a system of vehicle control, the combination with a dynamo-electric machine and a mechanical braking system, of means for electrically braking said machine, and means for automatically effecting the application of said braking system under predetermined high-speed conditions and releasing said application upon a predetermined decrease of speed.

3. In a system of vehicle control, the combination with a dynamo-electric machine and a mechanical braking system, of means for electrically braking said machine, and centrifugally-governed means for effecting the application of said braking system under predetermined high-speed conditions and releasing said application upon a predetermined decrease of speed.

4. In a system of vehicle control, the combination with a dynamo-electric machine and an electrically-controlled air-braking system, of means for regeneratively braking said machine, and means for automatically energizing the electrical control circuits for said braking system under predetermined high-speed conditions and interrupting such energization upon a predetermined decrease of speed.

5. In a system of vehicle control, the combination with a dynamo-electric machine and an electrically-controlled air-braking system, of means for regeneratively braking said machine, and centrifugally-governed means for effecting the energization of the electrical control circuits for said braking system under predetermined high-speed conditions and interrupting such energization upon a predetermined decrease of speed.

6. In a system of vehicle control, the combination with a dynamo-electric machine and a mechanical braking system, of means for electrically braking said machine, means for automatically actuating said braking system under predetermined abnormal conditions and eliminating said braking system upon a restoration of normal conditions, and further means associated with said automatic means for actuating said braking system at the end of the electrical braking period.

7. In a system of vehicle control, the combination with a dynamo-electric machine and a mechanical braking system, of means for electrically braking said machine, means for automatically effecting the application of said braking system under predetermined high-speed conditions and releasing said application upon a predetermined decrease of speed, and further means associated with said automatic means for effecting the application of said braking system under relatively low-speed conditions.

8. In a system of vehicle control, the combination with a dynamo-electric machine and a mechanical braking system, of means for electrically braking said machine, centrifugally-governed means for effecting the application of said braking system under predetermined high-speed conditions and releasing said application upon a predetermined decrease of speed, and further means associated with said centrifugally-governed means for effecting the application of said braking system under relatively low-speed conditions.

9. In a system of vehicle control, the combination with a dynamo-electric machine and an electrically-controlled air-braking system, of means for regeneratively braking said machine, means for automatically energizing the electrical control circuits for said braking system under predetermined high-speed conditions and interrupting such energization upon a predetermined decrease of speed, and further means associated with said automatic means for energizing said circuits under relatively low-speed conditions.

10. In a system of vehicle control, the combination with a dynamo-electric machine and an electrically-controlled air-braking system, of means for regeneratively braking said machine, centrifugally-governed means for effecting the energization of the electrical control circuits for said braking systems under predetermined high-speed conditions and interrupting such energization upon a predetermined decrease of speed, and further means associated with said centrifugally-governed means for energizing said circuits under relatively low-speed conditions.

In testimony whereof I have hereunto subscribed my name this 28th day of June, 1917.

NORMAN W. STORER.